3,284,398
HIGH TEMPERATURE ADHESIVE
John M. Warren, Weatherford, and Harold P. Owen, Fort Worth, Tex., assignors to General Dynamics Corporation, Fort Worth, Tex., a corporation of Delaware
No Drawing. Filed Nov. 5, 1963, Ser. No. 321,409
10 Claims. (Cl. 260—30.4)

The present invention relates generally to improvements in metal bonding adhesives for the joining of structural materials. More particularly the invention relates to a thermo-setting adhesive composition generally comprised of a phenolic formaldehyde type synthetic resin polymer combined with an epoxy silicone plasticizer, a catalyst of the amine group, and various inorganic pigments, to produce a thermo-setting adhesive possessing exceptionally good high temperature bonding characteristics together with a high degree of over-all bonding integrity under all environmental conditions to which it may be subjected.

In the construction of aircraft, missiles and aerospace vehicles, adhesively bonded joints are frequently replacing riveted, bolted and welded structural joints. This transition is due to the fact that adhesively bonded structure is lighter, stronger, very resistant to fatigue strain, and is more aerodynamically streamlined than the conventional type joints, hereinabove mentioned. For example, a single layer of adhesive 0.005 of an inch to 0.015 of an inch thick will serve to bond metal to metal with a much higher strength-to-weight ratio than either bolts, rivets or welding can provide; even though in the case of bolts and rivets, each attachment point per se possesses a somewhat greater shear strength than adhesives. However, the number of such attachment points are physically limited, therefore, adhesives provide a stronger total bond due to the fact that the entire area of the faying surfaces are bonded. Welds also have physical limitations due to the limited area of attachment and to detrimental transformations in physical properties induced by heat.

While presently known conventional metal adhesives can produce a structural joint of considerable strength, they are restricted by several serious limitations. Two of the more serious limitations are decomposition at relatively moderate high temperatures and embrittlement at relatively low temperatures. Such adhesive systems, for example, those based on phenyl silane resin or mixtures of phenolic and epoxy resins are capable of bonding aluminum to aluminum with resultant tensile-shear-strengths in excess of 3,000 pounds per square inch at room temperatures. However, as hereinabove stated, adhesive decomposition begins to occur when the joint is subjected to high temperatures. This is best exemplified by the class of phenolic-epoxy based adhesives, which begin to decompose upon reaching a temperature of 325° F. Even the adhesives presently employed for high temperature applications decompose at from 350° F. to 500° F. after some 5 to 10 hours of exposure to these temperatures.

In addition to the above deleterious characteristics, presently known adhesives require carefully controlled manufacture processing and excessively long curing cycles. Such adhesives emit volatiles during the aforementioned cycles, thereby preventing their employment on non-perforated, sealed cellular core and also prevents their being bonded at low pressures. Another detrimental property of such adhesives resides in their being porous after bonding—hence, permeable to volatiles and liquids. This is of considerable importance when they are to be employed in the construction of fuel tight integral containers or fuel cells in aircraft and spacecraft. Further embrittlement, as hereinabove stated occurs; thus precluding efficient milling and machining of bonded structural hardware and often results in the adhesive shattering when the bonded structure is subjected to severe shock loads.

Therefore, it is the salient object of the present invention to provide a novel and improved thermo-setting, high temperature, high strength adhesive composition which is operative through a wide range of temperatures for long durations and employs a phenol formaldehyde resin of the epoxy novolac type, an exothermic catalyst, reactive plasticizer and various inorganic pigments to effectively bond metallic, plastic or laminated materials together or to each other, wherein a relatively short curing cycle and low pressure is required to effect a bond wherein no volatiles or corrosive by-products are released.

Another object is to provide a substantially non-porous adhesive which is impervious to aircraft fuel, hydraulic fluid and other liquids, thereby facilitating its employment in the construction of fuel tight hydrocarbon containers or fuel cells.

Other objects and advantages of the invention will become readily apparent from a consideration of the following description and appended claims. It should be further noted that the terms and expressions employed herein are terms of description and not limitation. No intention of excluding any equivalents of features shown or described or portions thereof should be ascribed to. However, recognition is given to the fact that various modifications are possible within the scope of the invention claimed.

It has been determined that the combination of reactive p,p'-sulfonyl dianiline with certain synthetic base polymers known for their high temperature adhesion, such as the phenolic type resins, specifically the epoxy novolac resins, can be successfully employed to bond metals and their alloys to themselves and each to the other to form joints that possess very great strength, do not readily decompose at high temperature or corrode the adherent materials, and are operative for prolonged periods and have integrity at high temperatures up to and above 500° F. as set forth in Patent No. 3,160,675 by Clarence J. Kastrop, assigned to the same assignee. It has been found that suitable plasticizers, such as epoxy silicone, and specifically a cyclic epoxy siloxane, mitigates the embrittlement of the adhesive at room temperatures without substantially affecting the adhesive qualities of the base polymer and further that the addition of a suitable filler or inorganic pigment, such as aluminum powder, will reduce the coefficient of thermal expansion; impart heat resistance, and preclude the development of hot spots by augmenting thermal conductivity of the adhesive. It is to be further noted that asbestos powder within a certain particle size range will impart thixotropy or flow control at curing temperatures.

The preferred phenolic resins are the type that are capable of being converted by heat to a permanently infusible state by chemical reaction with a suitable catalyst, such as p,p'-sulfonyl dianiline. These ingredients produce an exothermic reaction but require external heat to initiate the reaction and cause it to progress to the desired level of chemical cross linking necessary for thermal stability. These phenolic resins are of the epoxy novolac type, with a molecular weight in the range of 600. They react only through their epoxy groups and contain no residual phenolic hydroxyls to release volatiles at curing temperature. Such resins as hereinabove stated offer intrinsic good heat stability at elevated temperatures. This requires a high functionality which permits complex cross linking between resin and catalyst; developing consequent high softening point and resistance to thermal degradation. The functionality of the herein employed epoxy novolac averages 3.3 to 3.6 epoxy groups per molecule, compared to a functionality of 1.95 and below for substantially all of the known conventional epoxy resins. The close knit cross linking of the cured epoxy novolac assures better retention of mechanical properties at high temperatures and thereby enlarges those end use areas in which epoxy-type properties can be utilized. In addition, the methylene bridge between the phenyl groups is extremely thermal stable.

The epoxy novolac is represented by the following idealized structural formula in which the average value of $n$ is 1.3 to 1.6.

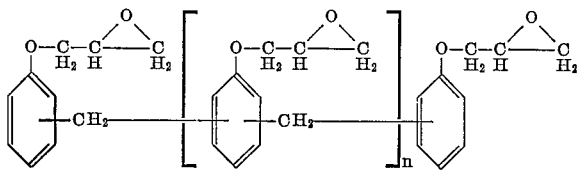

Epoxy novolac reacts only through its epoxy groups. No residual phenolic hydroxyls are present to limit shelf stability or release water by condensation reactions. Its typical uncured properties are as follows:

| | |
|---|---:|
| Appearance | Semi-solid at 75° F. |
| Epoxy equivalent weight | 175–182 |
| Viscosity, 150° F., cps. | 5000 |
| Specific gravity 25° C./4° C. | 1.220 |
| Total chloride (Parr Bomb), percent max. | 0.249 |
| Total volatiles, 150° C., mm. | 10 |
| Mercury, 15 min., percent | 0.30 | p,p'-Sulfonyl dianiline is represented by the following idealized structural formula:

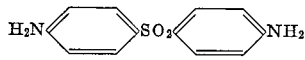

This catalyst has typical properties as follows:

| | |
|---|---:|
| Appearance | Fine powder |
| Formula weight | 248.3 |
| Amine hydrogen equivalent weight | 62 |
| Melting point, ° C. | 176–178 |

Epoxy silicone—a cyclic silicone (cyclic epoxy siloxane) containing five reactive epoxy groups per molecular weight. The plasticizer has the structural nomenclature 1,3,5,7,9 penta[3(2,3 epoxy propoxy)propyl]-pentamethylcyclopentasiloxane, and may be represented by the following formula:

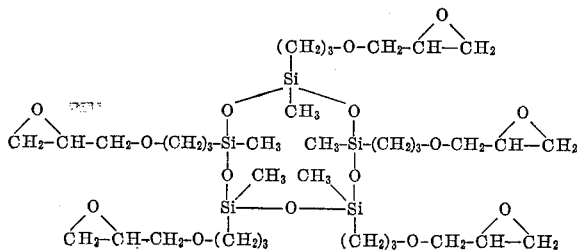

Its properties are as follows:

| | |
|---|---:|
| Molecular weight | 870 |
| Viscosity, cstks., 25° C. | 126±15 |
| Sp. gravity, 25° C. | 1.122±.003 |
| Refractive index, $N_a 25$ | 1.4640±.0015 |
| Flash point, ° F. | 550°±10° |
| Epoxy equivalent wt. | 174 |

Asbestos powder—this filler is the most critical filler in that the particle size and chemical characteristics control the flow properties of the adhesive formulation during cure. The powder found most suitable in our formulations is Vendor's Number CRL81–31, Asbestos Corporation of America. Suitable properties are as follows:

*Typical particle size distribution*

Dry screen analysis (Ro-Tap, 100 gms.) for 10 minutes:

| | |
|---|---:|
| +10 | 0.0 |
| +20 | 0.0 |
| +48 | 6.4 |
| +65 | 17.0 |
| +100 | 11.5 |
| +200 | 26.6 |
| −200 | 38.5 |
| Free moisture, percent Aug. | 1.0 |
| Specific gravity | 2.66 |
| Oil absorption | 24–28 lbs./100 lbs. asbestos |

The general range and preferred range of formulation for the adhesive is shown in the following table, expressed in percentage by weight:

| | General Range | Preferred Range |
|---|---|---|
| Epoxy Novolac | 30–45 | 34–41 |
| p,p'-Sulfonyl Dianiline | 10–20 | 13–18 |
| Cyclic Epoxy Siloxane | 2–15 | 5–11 |
| Thixotropic Filler | 8–32 | 10–23 |
| Other Filler | 13–31 | 19–29 |

A preferred recipe for the adhesive of the present invention employs an epoxy novolac such as a novolac manufactured by Dow Corning formula "D.E.N. 438":

| | Percent by weight |
|---|---:|
| Epoxy novolac | 37.2 |
| p,p'-Sulfonyl dianiline | 16.4 |
| Epoxy silicone (such as Dow Corning "QZ-8-0903") | 7.4 |
| Aluminum powder (such as Metals Disintegrating Company "MD-105") 90% passing a 325 mesh | 26.0 |
| Asbestos powder (200 mesh) | 13.0 |
| Total | 100.0 |

In most adhesives, the mixing and blending of the various chemical ingredients require careful preparation and rigid control. In the practice of the present invention, the preparation of the adhesive is comparatively simple and requires only three simple steps.

First, the epoxy novolac in the liquid form is mixed with the epoxy silicone in the ratios hereinabove set forth and heated to 220° F. Secondly, the p,p'-sulfonyl dianiline, which at room conditions is a solid material, is heated to approximately 350° F. or until melting occurs and subsequently added while mixing in the hereinabove stated quantities to the epoxy novolac and epoxy silicone. Heating is then terminated, and as the mixture cools and approaches 190° F., a specific amount of aluminum and asbestos powders are added; again while agitating the mixture. Although it is known to add inorganic fillers to adhesives for the purpose of filling or reinforcing the formulation, in the present invention fillers are incorporated to impact the delicate flow control at 350° F. required for simultaneous bonding of honeycomb core to upper and lower metal skins. The formation of fillets—i.e., beads of adhesive at the juncture of honeycomb cell walls and overlying skins—during bonding requires extremely careful selection of the fillers for particle size distribution and other physical and chemical properties. Where weight of the material used is of major importance, as in present aerospace applications, control of flow properties is both critical and mandatory, since only a minimum flow may be permitted on the vertical cell walls of the honeycomb, while surface tension must be such that the fillets are properly formed on both the top and bottom skins. The mixture is subsequently placed in a paint mixing mill to break up conglomerates and to disperse inorganic pigments. Proper dispersion of the asbestos in the mixture is absolutely necessary to impart proper flow and filleting of the adhesive at curing temperature.

The completed adhesive may be applied in the form of a calendered tape. This tape may employ a fabric carrier. Such fabric may be glass of various weights, weaves and finishes or other suitable high temperature resistant materials, such as nylon, etc. This carrier, although not a necessity, serves three purposes, first as a processing and handling aid, second as a spacer in bonded joints, and thirdly as a reinforcement. Specific carriers which have been found suitable include the following:

Glass cloth—Style 112, 2.09 oz./sq. yd., 0.003 in. thick, with Volan A (methacrylato chromic chloride) finish, or A-1100 (gamma-aminopropyl-triethoxy silane) finish; and Style 399, 0.75 oz./sq. yd., 0.003 in. thick, plain weave with Volan A, or A-1100 finish;

Polyester cloth, mat or felt—Dacron mat (Textryl Mat No. 504–59) 0.50 oz./sq. yd., 0.005 in. thick, available from C. H. Dexter and Sons, Windsor, Conn.); and Polyester felt, Style 5327, 0.88 oz./sq. yd., 0.005 in. thick, mechanical bond, available from Pellon Corp., New York, N.Y.

Further, this tape may have a polyethylene film applied to both sides which protects the adhesive and facilitates handing and storage. At the time of application, the polyethylene films are removed and the resin impregnated tape is inserted between the surfaces to be bonded. In some instances, as in those specimens used in the hereinafter recorded tests, the metal surfaces are first cleaned with methyl-ethyl-ketone and then degreased in a vapor degreaser of trichloroethylene. The materials to be bonded are then immersed in an aqueous solution of sulfuric acid sodium dichromate at 160° F. for 10 minutes. The impregnated tape is then stripped of its protective films and applied to the clean surfaces of the joints to be bonded. Curing is accomplished by subjecting the joints with the applied adhesive to a temperature of 350° F. and maintaining this temperature for 60 minutes at pressures of 25 p.s.i. or higher. When employing a carrier, and when flow is critical, additional amounts of thixotropic filler are required as finer carriers are used.

Adhesive joints in the examples immediately following were evaluated by lap-shear tests, flatwise tension tests, beam creep tests and shear beam tests.

Stainless steel sandwich panel adhesion data:
Skins: .015" PH15–7 Mo Cond TH1050 steel.
Core: 3/16" cellular, .59" thick non-perforated PH15–7 Mo Cond TH1050 Steel, 1.5 mil foil (8.4# density).
Cure: 1 hour at 350° F., 45 p.s.i. plus 1 hour post cure at 500° F.

Test No. 1: Flatwise tension, failing load in lbs. at room temperature—1995, 1505, 1945.

Test No. 2: Flatwise tension, failing load in lbs. @ 500° F.—520, 555, 495.

Test No. 3: Beam permanent deformation after 10 hours of 420° F. and 113 p.s.i. core shear load—0, 0, 0.

Test No. 4: Beam permanent deformation after 30 minutes of 490° F. and 113 p.s.i. core shear load—0, 6 mils, 10 mils.

Stainless steel lap shear data:
Material: 17–7PH, TH1050 steel .064" thick.
Specimen: Employed std. ½" overlap, values recorded in pounds per square inch.

| Test No. | Temperature Attained and Duration | Temperature at Which Specimen Was Tested | Failure in p.s.i. |
|---|---|---|---|
| 1 | Room Temp | Room Temp | 3,166 |
| 2 | Room Temp | Room Temp | 3,386 |
| 3 | 600° F., ½ hr | 600° F | 501 |
| 4 | 600° F., ½ hr | 600° F | 457 |
| 5 | 600° F., 24 hrs | Room Temp | 1,362 |
| 6 | 600° F., 48 hrs | Room Temp | 475 |
| 7 | 600° F., 48 hrs | Room Temp | 530 |
| 8 | 500° F., ½ hr | 500° F | 825 |
| 9 | 500° F., ½ hr | 500° F | 1,005 |
| 10 | 500° F., 24 hrs | 500° F | 706 |
| 11 | 500° F., 24 hrs | 500° F | 816 |
| 12 | 500° F., 24 hrs | Room Temp | 2,230 |
| 13 | 500° F., 24 hrs | Room Temp | 2,335 |

Beam creep data:
Materials: 2024–T81 0.063" skins; 1/8" cell, 8.1 lbs./ft.$^3$ density, non-perforated, 0.500" thick 5052 aluminum alloy core.

| Test No. | Temp., °F. | Time, Hours | Load, Pounds | Permanent Set, Inches |
|---|---|---|---|---|
| 1 | 350 | 10 | 775 | 0.070 |
| 2 | 350 | 10 | 775 | 0.060 |

Materials: PH15–7 molybdenum, TH1050 stainless steel skins and core. Skins 0.002", core 0.590" thick, 3 to 15 lbs./ft.$^3$ non-perforated.

| Test No. | Temp., °F. | Time, Hours | Load, Pounds | Permanent Set, Inches |
|---|---|---|---|---|
| 1 | 420/490 | 10/0.5 | 410 | 0.010 |
| 2 | 420/490 | 10/0.5 | 410 | 0.006 |
| 3 | 420/490 | 10/0.5 | 410 | 0.000 |

[1] Temperature designated by 420/490 indicate that the temperature was raised from 420° to 490° F. during the test run.

As thus described the present invention resides in a mixture of chemical compounds employed principally as a thermosetting adhesive for bonding metallic, plastic or laminated elements in which the elemental constituent is a synthetic base polymer of the phenolic formaldehyde type, more specifically the elemental constituent resides in an epoxy novolac resin possessing a high degree of functionality, consequently, a high degree of operability at sustained elevated temperatures. Said compound being also comprised of cyclic epoxy silicone, a curable high temperature plasticizer, primarily due to the intrinsic tendency of the elemental constituent to be brittle at low temperature and p,p'-sulfonyl dianiline, or any other suitable catalyst or curing agent from the amine group capable of effecting an exothermic reaction, chemically cross linking with the elemental constituent and possessing inherent high temperature stability. Further, the compound of the present invention is enhanced by the employment of suitable inorganic pigments such as 325 mesh aluminum powder and 200 mesh asbestos powder in combination of the hereinabove mentioned ingredients to effectively impart thixotropy at curing temperature, reduce thermal expansion and to augment its heat stability. Further, the heat transferring ability peculiar to aluminum powder is valuable as a heat distributing medium. This precludes the development of undesirable hot spots.

We claim:
1. An adhesive composite possessing high temperature strength and stability consisting of:
(A) from about 30.0% to 45.0% by weight epoxy novolac resin having an epoxy equivalent weight of about 175–182, a molecular weight of about 600 and a functionality of about 3.3 to 3.6 epoxy groups per molecule, (B) from about 10.0% to 20.0% by weight exothermic catalyst from the amine group having an amine hydrogen equivalent weight of about 62, (C) from about 2.0% to 15.0% by weight reactive cyclic epoxy siloxane plasticizer having an epoxy equivalent weight of about 174 and a molecular weight of about 870, (D) from about 8.0% to 32% by weight thixotropic filler material having a particle size wherein 100% passes a 100 mesh sieve of an inorganic pigment, (E) from about 13.0% to 31.0% by weight filler material of powdered inorganic pigment.

2. An adhesive composite possessing high temperature strength and stability, consisting of:

(A) from about 30.0% to 45.0% by weight epoxy novolac resin having an epoxy equivalent weight of about 175 to 182 and a molecular weight of about 600, (B) from about 10.0% to 20.0% by weight p,p'-sulfonyl dianiline and an exothermic catalyst, (C) from about 2.0% to 15.0% by weight cyclic epoxy siloxane having an epoxy equivalent weight of about 174 and a molecular weight of about 870.

3. An adhesive composite possessing high temperature strength and stability, consisting of:

(A) from about 30.0% to 45.0% by weight epoxy novolac resin having an epoxy equivalent weight of about 175–182, and a molecular weight of about 600, (B) from about 10.0% to 20.0% by weight p,p'-sulfonyl dianiline having an amine hydrogen equivalent weight of about 62 an exothermic catalyst, (C) from about 2.0% to 15.0% by weight 1,3,5,7,9 penta[3(2,3 epoxy propoxy)propyl]pentamethyl-cyclopentasiloxane having a high molecular weight and with substantially the same epoxide equivalent weight as said resin, (D) from about 8.0% to 32.0% by weight asbestos powder of a size wherein 100% passes a 100 mesh sieve, (E) from about 13.0% to 31.0% by weight zinc oxide having an average particle size of 0.35 microns.

4. An adhesive composite possessing high temperature strength and stability, consisting of:

(A) from about 34% to 41% by weight epoxy novolac resin having a molecular weight of about 600 and an epoxy equivalent weight of about 175–182, (B) from about 13% to 18% by weight p,p'-sulfonyl dianiline, (C) from about 5% to 11% by weight cyclic epoxy siloxane having an epoxy equivalent weight about the same as the epoxy equivalent weight of said resin, 5. An adhesive composite possessing high temperature strength and stability, consisting of:

(A) from about 34% to 41% by weight epoxy novolac resin having an epoxy equivalent weight of about 175–182 and a molecular weight of about 600, (B) from about 13% to 18% by weight p,p'-sulfonyl dianiline, (C) from about 5% to 11% by weight epoxy silicone having an epoxy equivalent weight of about 174 and a molecular weight of about 870, (D) from about 10% to 23% by weight asbestos powder of a particle size wherein 100% passes a 100 mesh sieve, (E) from about 19% to 29% by weight of a powder material comprising at least one inorganic filler of powdered aluminum having a particle size wherein 90% passes a 325 mesh sieve and zinc oxide of 99.9% purity having an average size of 0.35 micron.

6. An adhesive composite possessing high temperature strength and stability, consisting of:

(A) 37.2% by weight epoxy novolac having a molecular weight of about 600 and an epoxy equivalent weight of about 175–182, (B) 16.4% by weight p,p'-sulfonyl dianiline, (C) 7.4% by weight of a high molecular weight cyclic epoxy siloxane having the structural nomenclature 1,3,5,7,9 penta[3(2,3 epoxy propoxy)propyl]pentamethyl-cyclopentasiloxane having a molecular weight of about 870 and an epoxy equivalent weight of about 174, (D) 26.0% by weight thixotropic filler of asbestos powder having a particle size wherein 100% passes a 100 mesh sieve to control flow at bonding temperatures, (E) 13.0% by weight aluminum powder having a particle size wherein 100% passes a 325 mesh sieve.

7. The product of the reaction of an epoxy novolac polymer having a molecular weight of about 600 of the formula

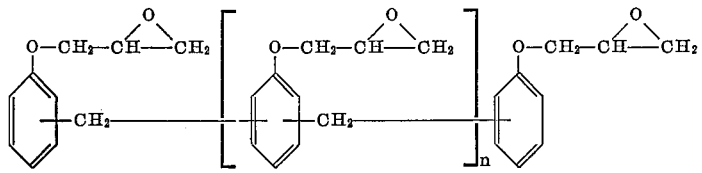

in which the average value of $n=1.3$ to 1.6 with epoxy siloxane 1,3,5,7,9 penta[3(2,3 epoxy propoxy)propyl] pentamethyl-cyclopentasiloxane having a molecular weight of about 870 of the formula

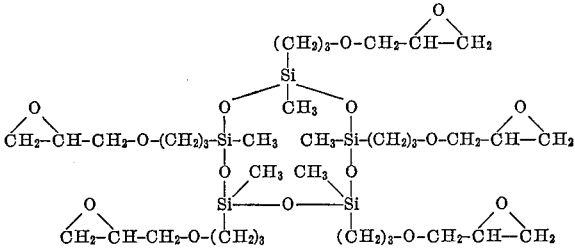

with melted p,p'-sulfonyl dianiline of the formula

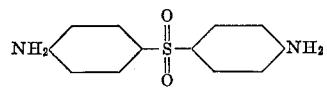

8. The product of the reaction of from about 30% to about 45% by weight of an epoxy novolac resin having a molecular weight of about 600 of the formula

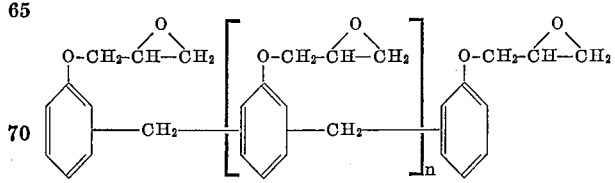

in which the average value of $n=1.3$ to 1.6 with about 2% to 15% by weight of cyclic epoxy siloxane 1,3,5,7,9 penta[3(2,3 epoxy propoxy)propyl]pentamethyl-cyclopentasiloxane having a molecular weight of about 870 of the formula

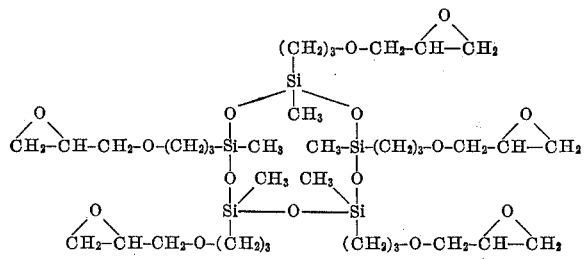

with about 10% to 20% by weight p,p'-sulfonyl dianiline of the formula

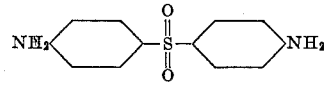

9. The adhesive of the reaction of mixing an epoxy novolac in the liquid form having a molecular weight of about 600 of about 37.2% by weight of the formula

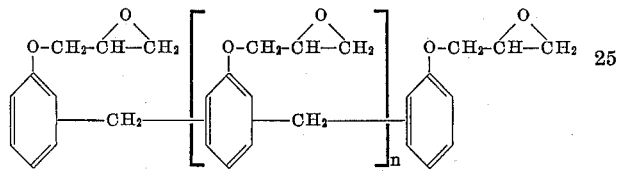

in which the average value of $n=1.3$ to 1.6 with about 7.4% by weight of a high molecular weight cyclic epoxy siloxane 1,3,5,7,9 penta [3(2,3 epoxy propoxy)propyl] pentamethylcyclopentasiloxane of the formula

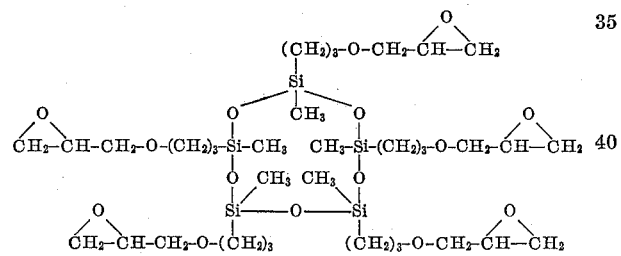

having a molecular weight of about 870, heating said mixture to about 220° F., melting about 16.4% by weight p,p'-sulfonyl dianiline for use as an exothermic catalyst having the formula

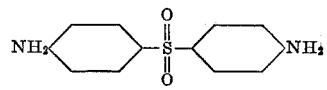

adding said catalyst to said first mixture, terminating the heat, and adding a thixotropic filler of asbestos powder having a particle size wherein 100% passes a 100 mesh screen in the amount of about 26% by weight as the mixture approaches 190° F., and at least one of a filler of aluminum powder having a particle size of which 100% passes a 325 mesh screen or zinc oxide powder having an average particle size of 0.35 micron average, in about 13% by weight, the mixture agitated while said fillers are added.

10. The process for making a high temperature adhesive comprising
  mixing about 30/ to about 45% by weight of an epoxy novolac in the liquid form of the formula

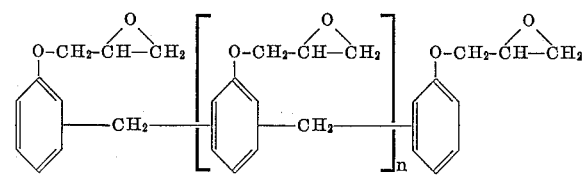

where $n=1.3$ to 1.6 and the molecular weight is 600 with about 2 to 15% by weight of a high molecular weight epoxy siloxane of the formula

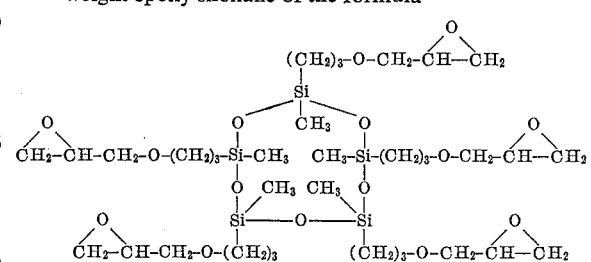

having a molecular weight of about 870, heating said mixture to about 220° F., selecting p,p'-sulfonyl dianiline having the formula

for use as an exothermic catalyst, heating said catalyst to about 350° F. and maintaining said heat until melting has occurred,
  adding said melted exothermic catalyst in the amount of about 10 to 20% by weight of said heated epoxy novolac-epoxy siloxane mixture, and then cooling the thus produced adhesive.

References Cited by the Examiner
UNITED STATES PATENTS

| | | | |
|---|---|---|---|
| 3,025,249 | 3/1962 | Chen | 260—37 |
| 3,155,743 | 11/1964 | Newey | 260—37 |
| 3,160,675 | 12/1964 | Kastrop | 260—47 |

OTHER REFERENCES

H. Lee and K. Neville: 'Epoxy Resins," McGraw Hill Book Co., New York, 1957, pages 150–151, 219, 226 relied upon.

MORRIS LIEBMAN, *Primary Examiner.*

J. E. CALLAGHAN, *Assistant Examiner.*